(No Model.)
G. SANFORD.
MACHINE FOR CUTTING AND GRINDING CORNSTALKS, &c.
No. 291,231. Patented Jan. 1, 1884.
2 Sheets—Sheet 2.
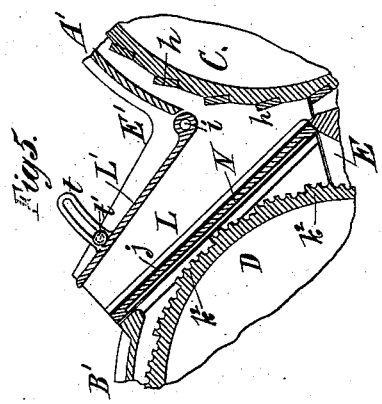
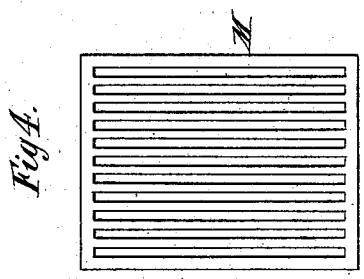
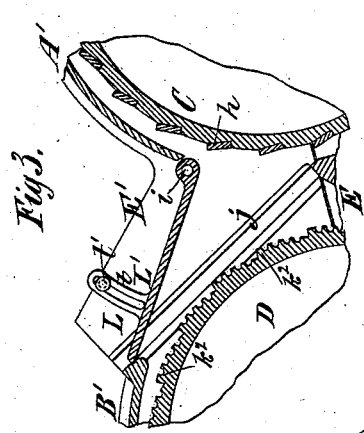

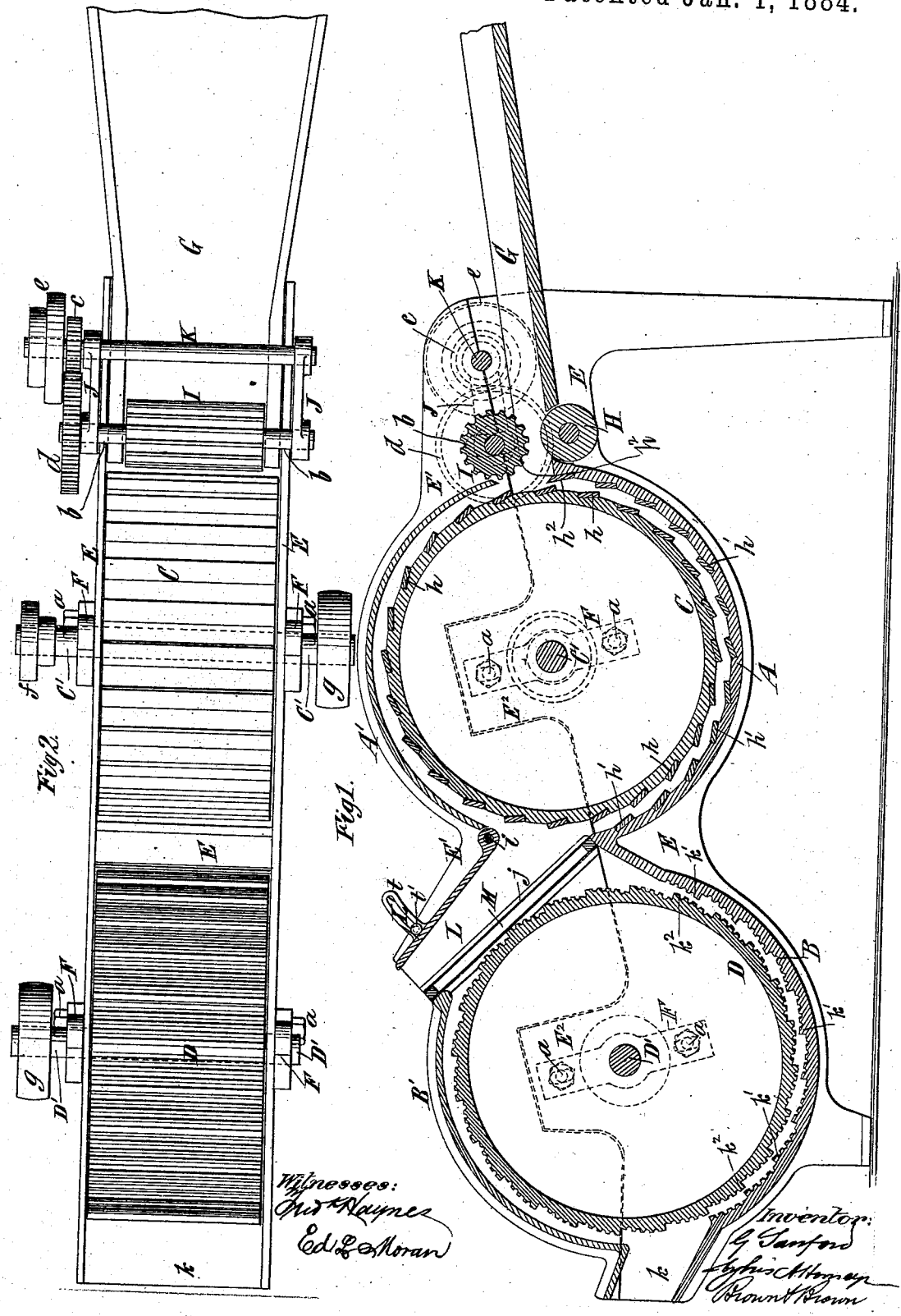

UNITED STATES PATENT OFFICE.

GELSTON SANFORD, OF BROOKLYN, NEW YORK.

MACHINE FOR CUTTING AND GRINDING CORNSTALKS, &c.

SPECIFICATION forming part of Letters Patent No. 291,281, dated January 1, 1884.

Application filed May 15, 1883. (No model.)

*To all whom it may concern:*

Be it known that I, GELSTON SANFORD, of the city of Brooklyn, in the county of Kings and State of New York, have invented a new and useful Improvement in Machines for Cutting and Grinding Cornstalks and other Materials, of which the following is a specification.

An important object of my improvement is to provide a very effective machine for cutting up and grinding or macerating cornstalks, either with or without the corn, and in a green or dry state, to prepare them for fodder, and also to separate the light inner husk which surrounds the ears and save it for upholstery purposes. The machine may, however, be used for cutting up and reducing stalks, roots, and substances of various kinds suitable for feeding to stock, in order to bring them into a condition in which they may be most economically used. My machine belongs to that class in which are employed a cylindrical fixed casing provided with internal blades or bars, and a rotary part or cylinder provided with corresponding blades or bars which act in conjunction with the fixed blades to effect the cutting and grinding or reducing of the substances operated upon; and I may employ in connection with the cylindrical casing and cylinder a second and similar casing and cylinder, into which the materials are delivered after being operated upon by the blades of the first mentioned casing and cylinder, if it is desired to subject them to further operation.

The invention consists in various novel features of construction and combinations of parts, as more fully hereinafter described, and as pointed out in the claims.

In the accompanying drawings, Figure 1 is a vertical section of a machine embodying my invention. Fig. 2 is a plan thereof with the upper part of the frame and casing removed. Fig. 3 is a view similar to Fig. 1 of certain parts, showing them in a different position; and Figs. 4 and 5 are detail views hereinafter described.

Similar letters of reference designate corresponding parts in all the figures.

A A' B B' designate the two cylindrical casings, in which are arranged two rotary parts or cylinders, C D, which are mounted on shaft C' D', whereby they are rotated. The lower portions, A B, of these casings are fixed in the frame or sides E of the machine; but the upper portions, A' B', are made removable, and have connected with them side pieces, E', which close upon the upper edges of the pieces E, and so make the casings complete. When access is to be had to the cylinders C D, or to the interior of the casings A B, the upper portions, A' B', may be removed as one piece, and when in place they may be secured by any suitable catches or devices not here shown. As here shown, the sides E have upwardly-projecting portions E², over which the upper side portions, E', fit, as shown in dotted lines in Fig. 1, and the shafts C' D' have their bearings in yokes F, which are secured to the sides E by bolts $a$ passing through slotted holes. By loosening these bolts the yokes may be shifted and the cylinders adjusted nearer to or farther from the lower portions, A B, of the casings, as may be desired.

G designates a trough or feed board, into or onto which the stalks or other materials to be cut are placed; and H I designate two feed-rolls, by which the stalks or other materials are carried or fed forward into the machine at a uniform rate. The lower roll, H, is here shown as fitted or supported in fixed bearings, and has a smooth surface. It works upward through the trough or table G, as shown in Fig. 1, and it is advantageous to make it with a smooth surface, as then the loose grains of corn cannot drop down between the roller and the edges of the opening in which it works, in case the machine is used for cutting up stalks and the ears of corn on them. The roller H is not rotated positively, but is free to turn by the passage of the stalks or other materials over it. The upper feed-roller, I, is fluted or grooved, as here shown, and is supported in bearings in swinging links or arms J, which are fulcrumed on a driving-shaft, K, and the journals of said roller work in arc-shaped slots $b$ in the sides E', as shown in dotted lines in Fig. 1. The roller I, therefore, in rising and falling describes an arc about the driving-shaft K. Upon the shaft K is a spur-pinion, $c$, which engages with a spur-gear wheel, $d$, on the journal of the upper roller, I, and thereby said roller I is rotated positively. Upon the shaft K is a cone-pulley, $e$, and on the shaft C' of the cylinder C is a second cone-pulley, $f$, from which a belt may be carried to the cone-pulley $e$, for operating the driving-shaft at different speeds, and so varying the rotation of the upper roller, I, and the feed of materials to the machine.

The two cylinders C and D may be rotated at any desired speeds by means of belts passing around pulleys $g$ on their shafts C' D'. (Shown in Fig. 2.)

At intervals on the cylinder C are secured blades or bars $h$, which consist simply of flat bars set so that one edge will project slightly from the surface of the cylinder. These blades have blunt or non-cutting edges, and they are set so that they are tangential to the surface of the cylinder. Around the interior surface of the lower part, A, of the casing A A' are secured blades or bars $h'$, like those just described, and all having non-cutting projecting edges; but immediately adjacent to the roller H is set a blade, $h^2$, having a sharp edge, as clearly shown in Fig. 1. As the stalks are fed forward against the cylinder C by the action of the feed-rolls H I, they are cut into small pieces by the blades $h$ of the cylinder forcing them against the sharp or cutting-blade $h^2$, and the whole stalk and the ears and husks also are thus cut up. After being cut, the pieces are carried downward by the rotation of the cylinder C, and are repeatedly acted upon by the blades $h$ and $h'$, and thereby crushed, ground, or reduced. The fine thin husks which cover the ears are not, however, broken, as they yield under the action of the blades $h\,h'$ after being cut into rings or spirals by the blade $h^2$.

Immediately behind the cylinder C the casing A' is provided with an outlet chute or nozzle, L, which is directed upward, the upper side of which is formed by a board or plate, L', hinged at $i$, and adapted to be closed down to entirely close the chute or nozzle L. The plate L' is provided with means for holding it in place after adjustment. I have here shown the plate as provided with a slotted arm, $t$, which may be connected with the side E' in any position by a bolt or screw, $t'$. Other means may be used for the purpose.

On the lower side of the chute or nozzle L is a slideway, $j$, which controls the entrance or mouth to the second cylindric casing, B B', and on the back or rear side of said casing is a second delivery chute or nozzle, $k$, a part of which is shown in Fig. 1. To the slideway $j$ are fitted a grating, M, of the form shown in Figs. 1 and 4, and a shutter, N, of the form shown in Fig. 5. The purpose of the grating M is to screen material delivered from the casing A A', and the purpose of the shutter N is to entirely cut off communication between the casings A A B B'. The cylindric casing B B' is provided with inclined teeth or projections $k'$, and the cylinder D is provided with corresponding inclined teeth or projections, $k^2$. Both the teeth or projections $k'\,k^2$ are or may be grooved on their faces as here shown, and so act effectively on the materials subjected to them.

In some cases it may be desired to subject the cornstalks or other materials only to the action of the blades or bars $h\,h'$, and not to pass them through the casing B B'. In such case I place the shutter N in the slideway $j$, as shown in Fig. 5. A blast or current of air is generated by the rapid rotation of the cylinder C, and as all inlet to the casing B B' is prevented by the shutter N all the material will be blown out at the nozzle L. In other cases it may be desired to deliver all the material from the first casing, A A', into the second casing, B B', and in such case I leave the opening at the slideway $j$ entirely open and lower or let down the board or plate L' into the position shown in Fig. 3. All the material may be thus delivered into the casing B B', and finally delivered at the nozzle or delivery-chute $k$. (Shown in Fig. 1.) In still other cases it may be desired to deliver the fine husk which surrounds the ears from the nozzle L, while the principal portion of the material is passed through the casing B B'. In that case I leave the part L' elevated, as shown in Fig. 1, and fit in the slideway $j$ the grating M, which will prevent the passage of husks, while the other material will pass through the grating. The blast of air produced by the rapid rotation of the cylinder C will then drive all the husks or light substances out at the nozzle L, thus providing for their escape from the machine unmixed with other materials.

What I claim as my invention, and desire to secure by Letters Patent, is—

1. The combination of a cylindrical casing and a cylinder capable of rotation therein, both provided with crushing or reducing blades having blunt or non-cutting edges, and a sharp-edged cutting-blade fixed in the casing adjacent to the feed-inlet, substantially as and for the purpose herein described.

2. The combination of the cylindrical casing A A' and rotating cylinder C, both provided with blades $h\,h'$, having blunt or non-cutting edges, and consisting of bars of rectangular cross-section, secured to the casing and cylinder so that one edge projects from their surfaces, and the sharp-edged cutting-blade $h^2$, substantially as and for the purpose herein described.

3. The combination, with the cylindrical casing and the rotary cylinder, of the feed trough or chute G, the feed-roller H, having a smooth surface and free to rotate by the passage of material over it, the roughened roller I, the driving-shaft K, the links or arms J, carrying the bearings of the roller I and fulcrumed on the shaft K, and the gear-wheels $c\,d$, for rotating said roller I from said shaft K, substantially as and for the purpose described.

4. The combination of the two casings A A' B B' and their cylinders C D, of the feed-inlet at the side of the casing A A', the delivery-outlet *k* at the side of the casing B B', and the chute L and grating M between adjacent sides of said casings, all being so organized that the rotation of the cylinder C will produce the passage of material through the chute L and onto the grating M, substantially as described.

5. The combination, with the two casings and their rotary cylinders, of the delivery nozzle or chute L, having a movable side or top, L', and the slideway *j*, and the grating M or shutter N, fitted to said slideway, substantially as described.

GELSTON SANFORD.

Witnesses:
FREDK. HAYNES,
ED. L. MORAN.